United States Patent
Weinmann et al.

(10) Patent No.: US 12,420,888 B2
(45) Date of Patent: Sep. 23, 2025

(54) METHOD FOR CONTROLLING AN ELECTRIC BICYCLE, AND ELECTRIC BICYCLE

(71) Applicant: Robert Bosch GmbH, Stuttgart (DE)

(72) Inventors: Matthias Weinmann, Balingen (DE); Daniel Baumgaertner, Neustetten (DE); Andreas Wienss, Eningen Unter Achalm (DE); Joseph Reck, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 140 days.

(21) Appl. No.: 18/552,506

(22) PCT Filed: Mar. 21, 2022

(86) PCT No.: PCT/EP2022/057272
§ 371 (c)(1),
(2) Date: Sep. 26, 2023

(87) PCT Pub. No.: WO2022/207378
PCT Pub. Date: Oct. 6, 2022

(65) Prior Publication Data
US 2024/0174322 A1    May 30, 2024

(30) Foreign Application Priority Data
Mar. 30, 2021 (DE) .................. 10 2021 203 172.2

(51) Int. Cl.
*B62M 6/50*    (2010.01)
*B62J 50/21*    (2020.01)

(52) U.S. Cl.
CPC .............. *B62M 6/50* (2013.01); *B62J 50/21* (2020.02)

(58) Field of Classification Search
None
See application file for complete search history.

(56) References Cited

U.S. PATENT DOCUMENTS

| 12,208,858 B2 * | 1/2025 | Hahn | B62M 6/50 |
| 2019/0300104 A1 * | 10/2019 | Saruwatari | B62K 23/06 |
| 2021/0171154 A1 * | 6/2021 | Baumgaertner | B62M 6/45 |

FOREIGN PATENT DOCUMENTS

| DE | 197 32 468 A1 | 6/1998 |
| DE | 10 2016 224 314 A1 | 6/2017 |

(Continued)

OTHER PUBLICATIONS

International Search Report corresponding to PCT Application No. PCT/EP2022/057272, mailed Jul. 25, 2022 (German and English language document) (6 pages).

*Primary Examiner* — Daniel L Greene
(74) *Attorney, Agent, or Firm* — Maginot, Moore & Beck LLP

(57) ABSTRACT

A method for controlling an electric bicycle that can be operated with motor force and/or with pedal force is disclosed. The method includes (i) providing a trigger signal for enabling the activation of a walk mode to a control unit of the electric bicycle, (ii) providing a measurement signal of a sensor device regarding a property of the electric bicycle and/or regarding a component comprised by the electric bicycle to the control unit, (iii) detecting plausibility of the trigger signal on the basis of the provided measurement signal, and (iv) controlling the electric bicycle by enabling the activation of the walk mode in accordance with the detection of the plausibility of the trigger signal. Also disclosed is an electric bicycle that can be operated with motor force and/or with pedal force.

13 Claims, 3 Drawing Sheets

(56) References Cited

FOREIGN PATENT DOCUMENTS

| | | |
|---|---|---|
| DE | 10 2016 218 374 B3 | 2/2018 |
| DE | 10 2018 104 664 A1 | 9/2018 |
| DE | 10 2019 216 075 A1 | 5/2020 |
| EP | 3 251 936 B1 | 7/2020 |
| JP | H8-150982 A | 6/1996 |
| JP | H9-123982 A | 5/1997 |
| JP | H10-167161 A | 6/1998 |
| JP | H10-324290 A | 12/1998 |
| JP | H11-49078 A | 2/1999 |
| JP | H11-59557 A | 3/1999 |
| JP | H11-105776 A | 4/1999 |
| JP | 2012-30767 A | 2/2012 |
| JP | 2012-224232 A | 11/2012 |
| JP | 2017-114449 A | 6/2017 |
| WO | 2021/131674 A1 | 7/2021 |

\* cited by examiner

METHOD FOR CONTROLLING AN ELECTRIC BICYCLE, AND ELECTRIC BICYCLE

This application is a 35 U.S.C. § 371 National Stage Application of PCT/EP2022/057272, filed on Mar. 21, 2022, which claims the benefit of priority to Serial No. DE 10 2021 203 172.2, filed on Mar. 30, 2021 in Germany, the disclosures of which are incorporated herein by reference in their entirety.

The disclosure relates to a method for controlling an electric bicycle that can be operated with motor force and/or pedal force with an electric drive. Furthermore, the disclosure relates to such an electric bicycle.

BACKGROUND

EP 3 251 936 B1 discloses a control method for an electric motor for controlling a walk aid of an electric bicycle in accordance with a detected inclination angle of the electric bicycle.

Furthermore, methods for securing a walk aid have already been proposed. In current implementations of a walk aid, a planned activation of the walk aid is secured by means of a two-stage concept. An operating element is first pushed one time, and thus the walk aid is activated, wherein a further operating element must then be held within a certain period in order to switch on the walk aid.

SUMMARY

The disclosure relates to a method for controlling an electric bicycle that can be operated with motor force and/or with pedal force, comprising the method steps of: providing at least one trigger signal for enabling the activation of a walk mode and/or a trigger signal for activating the walk mode to a control unit of the electric bicycle; providing a measurement signal of a sensor device regarding a property of the electric bicycle and/or regarding a component comprised by the electric bicycle to the control unit; detecting plausibility of the trigger signal for enabling an activation of the walk mode and/or the trigger signal for activating the walk mode on the basis of the provided measurement signal; and controlling the electric bicycle by enabling the activation of the walk mode in accordance with the detection of the plausibility of the trigger signal for enabling the activation of the walk mode and/or activating the walk mode in accordance with the detection of the plausibility of the trigger signal for activating the walk mode.

The electric bicycle comprises a crank drive, typically connected to two cranks, each having a pedal arranged thereon for receiving a force exerted by a driver of the electric bicycle. A crank drive, cranks, and pedals serve to convert the force exerted by the driver into a driver torque acting on the crank drive. The driver torque can be converted into an output torque acting on at least one wheel of the electric bicycle in order to drive the electric bicycle. The electric bicycle is at least partially driven in an operating state with an electric drive comprising a motor. To this end, the driver torque is superimposed on a drive torque generated by the electric drive when converted into the output torque.

In high-quality electric bicycles, at least one torque sensor is usually used in order to sense the driver torque. The detected driver torque is then amplified by the electric drive, in particular proportionally, upon a driver's request for assistance. The detection by means of a torque sensor provides the driver with a natural driving feeling, as an increased use of a force simultaneously leads to increased assistance up to maximum assistance level.

A computer-implemented method for activating a walk mode, in particular a control method for controlling the walk mode, comprises, according to the prior art, a two-stage activation concept, wherein the first stage represents an enabling of the activation and the second stage represents an activation of the walk mode. The enabling for activating the walk mode, in particular the control method for controlling the walk mode, can be carried out via a separate enabling button or via a detected enabling input on an operating unit of the electric bicycle. As a result of the enabling, a specified period of time to activate the walk mode passes, during which time the electric bicycle user can activate the power assistance when pushing the electric bicycle using the electric drive by actuating an activation input. This activation input is detected by a separate activation button of an operating unit of the electric bicycle. Then, a motor torque for pushing the electric bicycle is generated by means of the electric drive. Typically, the user must permanently actuate the activation input in order to cause a continuous generation of the motor torque when pushing. With the two-stage activation concept, an undesirable activation of the walk mode is avoided.

The control unit serves for controlling the functional components of at least the electric drive of the electric bicycle and is configured, i.e. wired and/or programmed, in order to generate and pass to the drive a control signal for controlling the electric drive, in accordance with at least one of the torque measurement signals provided by the at least one torque sensor. The control unit is further configured so as to carry out the proposed method for operating the electric bicycle. The control unit is configured so as to receive and process a provided trigger signal and the provided measurement signals, to detect a plausibility of the trigger signal in accordance with the measurement signals, and to enable an activation of the walk mode of the electric bicycle in accordance with the detection of the plausibility of the trigger signal, or to activate the walk mode. By "enabling activation," it is to be understood that the walk mode can be activated after enabling, and this function is thus not blocked or locked. By "activating," it is to be understood that the walk mode is carried out.

By "providing," it is to be understood that corresponding values and/or sizes, in particular information, are transferred or passed on by way of signal technology to the control unit executing the method, in particular to a processor device or a computing device of the control unit. The provision can generally occur in any form; preferably, the provision is carried out by means of passing on by way of signal technology at least one trigger signal as well as a measurement signal of a sensor device to the control unit.

A "trigger signal for enabling the activation" is in particular a first part of a two-stage activation concept, in particular an activation request. In one embodiment of the method, the trigger signal is triggered by a user of the electric bicycle, for example as a result of an actuation of an operating unit. In an alternative or additional embodiment of the method, it is also conceivable that the trigger signal is triggered automatically, for example in accordance with an operating state of the electric bicycle, and provided to the control unit.

A "trigger signal for enabling the activation" is in particular a second part of a two-stage activation concept, in particular an activation. In one embodiment of the method, the trigger signal is triggered by a user of the electric bicycle, for example as a result of an actuation of an operating unit. In an alternative or additional embodiment of the method, it is also conceivable that the trigger signal is triggered automatically, for example in accordance with an operating state of the electric bicycle, and provided to the control unit.

It should be noted that in this document, the term "trigger signal" is to be understood as both the trigger signal for enabling activation and the trigger signal for the activation, unless it is explicitly stated which trigger signal is involved.

A "measurement signal regarding a property of the electric bicycle and/or a component comprised by the electric bicycle" includes any form of measurement signal suitable to characterize a state of the electric bicycle in order to check the trigger signal based thereon, in particular its validity or plausibility. "Plausible" is to be understood to mean when the trigger signal is assessed such that its provision does not contradict a situation and/or a state, in particular an operating state, of the electric bicycle and/or a component of the electric bicycle, or is reasonably compatible with this situation and/or state. A measurement signal is detected, in particular measured, by means of a sensor device. A sensor device is to be understood as a measurement device that determines a property of the electric bicycle and/or a component comprised by the electric bicycle, for example with the application of physical or chemical laws.

The present disclosure makes it possible to overcome disadvantages of the prior art discussed above. In particular, the present disclosure makes it possible to improve the currently applied two-step activation concept, which is often not intuitively understandable and difficult to implement for a user of the electric bicycle.

Thus, in one embodiment example, the present disclosure makes it possible to provide a trigger signal for enabling the activation to the control unit as a result of an actuation (for example, pushing for 2 seconds) of an operating element of an operating unit. In order to secure the novel activation concept, it is now possible in this embodiment example to activate, in particular to control or regulate, the execution of the walk mode on the basis of measurement signals of further sensors arranged in or on the electric bicycle, for example in the event that an acceleration of the electric bicycle in the walking direction is detected. The present disclosure advantageously allows that already the enabling of the activation of the walk mode in the first step due to the additional plausibility is sufficient in order to avoid an accidental and/or unintended activation of the walk mode. Then, in a henceforth very intuitive manner, the walk mode itself can be activated, in particular controlled or regulated, even when this intuitive manner is no longer clearly a desire of the user for activating or carrying out the walk mode.

In a further embodiment example, it is possible to provide a trigger signal for activating the walk mode to the control unit as a result of an actuation (for example, continuous pushing) of an operating element of an operating unit, wherein a trigger signal for enabling the activation is also provided to the control unit as a result of an actuation of the operating element. A plausibility check of the trigger signal for enabling the activation and/or the trigger signal for activating the walk mode using measurement signals provided by means of sensors arranged in or on the electric bicycle advantageously allows that a secure realization of an activation concept of the walk mode can be implemented despite the recourse to a single operating element. The plausibility check serves in particular as a second step of the activation concept. For example, the plausibility check can be carried out by evaluating an acceleration or speed of the electric bicycle in the walking direction. Thus, a very intuitive manner of enabling the activation and/or activation of the walk mode can also be realized here.

Consequently, this results in an electric bicycle with increased safety, which at the same time makes intuitive operation by a user possible. Independently thereof, different operating units, in particular from different manufacturers, can be used with the electric bicycle, wherein their proper functionality need not be previously secured. Above all, the implementation of the proposed method makes possible a secure implementation of an activation concept for the activation of the walk mode using only one necessary input by means of an operating unit. The advantageous two-stage operation, i.e. securing, of the activation can be realized using further sensor signals in the context of intuitive movement (e.g. pushing) of the electric bicycle.

In one embodiment of the method, the measurement signal relates to a position of the electric bicycle, and the plausibility of the trigger signal is detected when the electric bicycle is in an upright position. The position of the electric bicycle refers to its orientation in three-dimensional space ("lying," "standing," etc.) and can be detected, for example by means of position sensors, in particular by means of at least three position sensors. Inertial sensors known to the person skilled in the art, for example, are used as position sensors, in particular a 6D inertial sensor system comprising acceleration and/or rotation rate sensors. "In an upright position" is understood in particular to mean that the bicycle is positioned standing on its wheels, therefore not lying on the ground or placed upside down. In this way, it can be ruled out that the trigger signal has been falsely or accidentally triggered, for example, as a result of an accident or as part of a maintenance operation in which an operating element provided for enabling the walk mode is actuated on the electric bicycle.

In one embodiment of the method, the measurement signal relates to a state of motion of the electric bicycle, more particularly a speed and/or an acceleration, and the plausibility of the trigger signal is detected when the state of motion satisfies a predetermined condition. In one embodiment example, the predetermined condition is realized as a threshold value. Thus, it is conceivable to classify a trigger signal as plausible only when the forward speed of the electric bicycle is less than 6 km/h, in particular with additionally negligible acceleration. Sensor technology for a speed measurement and an acceleration measurement is generally known to the person skilled in the art. In this way, it can be ruled out that the trigger signal is triggered falsely or accidentally during the trip, in particular by the user of the electric bicycle.

In one embodiment of the method, the measurement signal relates to a driver torque applied to the crank drive of the electric bicycle, and the plausibility of the trigger signal is detected when the driver torque is substantially, and within tolerance, zero. It is further conceivable to use a period of time over which the driver torque is already zero as a plausibility criterion. "Substantially and within tolerance" is to be understood to mean that the measurement signal does not have to be exactly zero; rather, minor deviations, for example up to 5 Nm or in the context of a measurement signal noise, also lead to a plausibility of the trigger signal. In this way, it can be ensured that the trigger signal is classified as plausible only in situations in which a user of the electric bicycle does not operate the bicycle in the context of cycling.

In one embodiment of the method, the measurement signal relates to a user cadence, and the plausibility of the trigger signal is detected when the cadence is substantially, and within tolerance, zero. The cadence denotes the number of revolutions of the crank drive per unit of time, for example 60 revolutions per minute, and can be determined in different ways, for example by means of a cadence sensor or from a speed of the motor of the electric drive. It is further conceivable to use a period of time over which the user cadence is already zero as a plausibility criterion. "Substantially and within tolerance" it is understood to mean that the measurement signal does not have to be exactly zero; rather, minor deviations, for example up to 5 revolutions/min or in the context of a measurement signal noise, also lead to a plausibility of the trigger signal. In this way, it can be ensured that the trigger signal is classified as plausible only in situations in which a user of the electric bicycle does not operate the bicycle in the context of cycling.

In one embodiment of the method, the measurement signal relates to a duration of the provision of the trigger signal, and the plausibility of the trigger signal is detected when the duration falls below a predetermined threshold value. In this way, it can be ensured that the generation of the trigger signal is actually attributed to a one-time (single) operation, for example a one-time actuation of an operating element. It can be ensured that the trigger signal is not due to a faulty and thus in particular due to a longer-term triggering, for example due to a mechanically jammed operating element. In one embodiment example, the threshold value can be 10 seconds, in particular 5 seconds or 1 second, quite particularly 0.5 seconds. As a result, situations that could lead to safety-critical behavior of the electric bicycle can be avoided. The plausibility check on the basis of measurement signals of at least one sensor device enables a decision to be made as to whether the request is desired by the driver in the current driving situation or due to a fault in the requesting device, for example the operating unit.

In one embodiment of the method, in addition to enabling the activation of the walk mode, the trigger signal is also used in order to maintain an activated state (i.e. for activation) of the walk mode. It is conceivable that the trigger signal is generated over an extended period of time (for example, by holding pressed an operating element of an operating unit of the electric bicycle). Initially, the trigger signal is recognized as plausible on the basis of a measurement signal, for example, when a pushing forward of the electric bicycle is detected by means of the measurement signal and consequently the assistance by the electric drive is switched on. Subsequently, the sustained activation of the walk mode generates the assistance corresponding to the duration of the activation. In this case, it is further conceivable that a plausibility of the trigger signal used for activating the walk mode is detected using a measurement signal of the sensor device provided to the control unit and/or a further sensor device. Consequently, the ongoing trigger signal for the activation is also subjected to a plausibility test on the basis of a measurement signal, for example on the basis of a measurement signal that characterizes a speed of the electric bicycle, wherein this speed may not exceed 6 km/h. If the activation of the walk mode is suspended (for example, by releasing the operating element), the walk mode is turned off. By activating it again (for example, pressing the operating element again), the walk mode can then be switched on again. It is conceivable that a time threshold can be specified for the switching on again, which, if exceeded, will require a re-enabling of the activation of the walk mode.

It should be noted that the embodiments of the method can also be joined into meaningful combinations. For example, it is conceivable that, in the previous embodiment in which the trigger signal is used in order to maintain the activated state of the walk mode in addition to enabling the activation of the walk mode, wherein the trigger signal is generated over a longer period of time, namely for as long as the walk mode is to be activated, a plausibility check of both the trigger signal for releasing the activation and the trigger signal for activation is carried out on the basis of a measurement signal, using, for example, a measurement signal regarding a driver torque applied to the crank drive of the electric bicycle or a cadence or a speed of the electric bicycle.

In one embodiment of the method, the trigger signal is provided by means of an operating unit by a user of the electric bicycle. Diverse operating units, in particular comprising operating elements (input elements), are conceivable and generally known to those skilled in the art. In one embodiment example, the operating unit is provided on the handlebar of the electric bicycle. Alternatively or additionally, the operating unit can be operated by means of a voice input. Furthermore, a separate operating unit is conceivable, for example in the form of a smart device (smart phone, smart watch, or the like) that can be coupled to the control unit by way of signal technology.

In one embodiment of the method, the enabling of the activation of the walk mode and/or the activation of the walk mode is suspended when the plausibility of the trigger signal is not detected until the plausibility of the trigger signal is detected. For example, it is conceivable to classify the trigger signal as plausible from the point in time at which the speed falls below the threshold value mentioned above despite being triggered once or triggered continuously at a too high speed (see above). In an alternative or additional embodiment example, a negative trigger signal flank can be used in order to indicate the proper function of an operating element, such that the plausibility can be achieved as a result of the detection of the negative trigger signal flank. In this way, a particularly user-friendly implementation can be achieved.

In one embodiment of the method, in accordance with a number of provided trigger signals with undetected plausibility and/or dependent on a duration of one or more provided trigger signals, in particular independent of a detection of its plausibility, a function of the electric bicycle is carried out or terminated or modified. In particular, the enabling of the activation and/or the activation of the walk mode is blocked, so that the walk mode can no longer be activated. For example, this blocking can persist until a system restart or until a specified amount of time has elapsed. Furthermore, it is conceivable to output an indication (e.g. a warning) to the user of the electric bicycle, in particular to be displayed on a screen of the electric bicycle. In one embodiment example, it is conceivable to block the enabling of the activation or the activation of the walk mode when a trigger signal is present for more than 10 seconds at a driving speed of greater than 10 km/h and the request has commenced at a speed of greater than 10 km/h and/or when a trigger signal is present for more than 20 seconds at a driving speed of greater than 10 km/h and a request has commenced at a speed of less than 10 km/h, and/or a trigger signal is present for more than 10 seconds and a user is pedaling with sufficient driver torque (i.e. for example, a driver torque and a cadence lie above specified threshold values).

Furthermore, an electric bicycle is proposed that can be operated with motor force and/or with pedal force, having an electric drive, a crank drive, at least one torque sensor configured so as to detect a torque applied by a driver (user) to the crank drive, and a control unit, wherein the control unit is configured so as to actuate the electric drive in accordance with the detected torque and to carry out an embodiment of the method according to the disclosure.

BRIEF DESCRIPTION OF THE DRAWINGS

The disclosure is explained in further detail in the following description with reference to embodiment examples shown in the drawings. The drawings, the description, and the claims contain numerous features in combination. The skilled person will appropriately also consider the features individually and combine them into further meaningful combinations. In the figures, identical reference numbers denote identical elements.

The figures show.

BRIEF DESCRIPTION OF THE DRAWINGS

Figure 1:
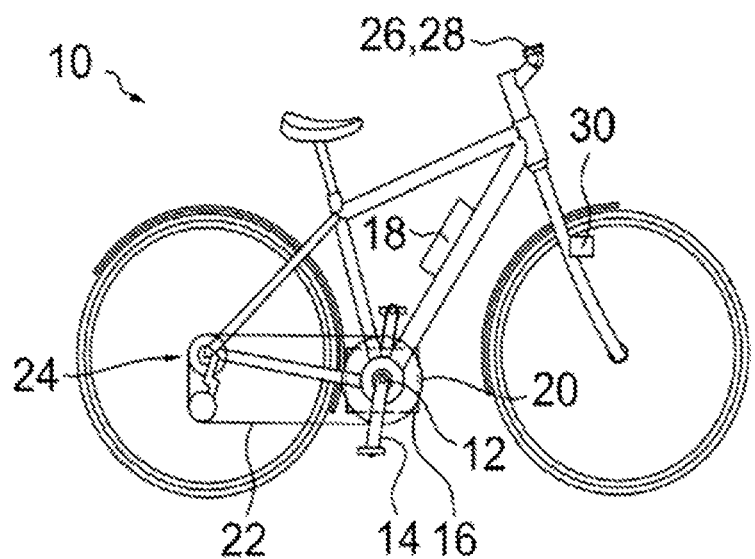
FIG. 1 a schematic view of an electric bicycle according to one embodiment example of the disclosure.

In FIG. 1, an embodiment example of the electric bicycle 10 according to the disclosure is shown. As can be seen from FIG. 1, the electric bicycle 10 comprises a crank drive 12 having two cranks 14 and an electric drive 16. A battery used in order to power the electric drive 16 bears the reference number 18. Furthermore, a chainwheel 20 is provided on the crank drive 12, in which a chain 22 engages, so that an output torque can be transferred from the chainwheel 20 to a sprocket at a gearshift 24 on the rear wheel of the electric bicycle 10. Furthermore, the electric bicycle 10 comprises a control unit 26. The control unit 26 is connected to the electric drive 16 and is configured so as to control the electric drive 16 according to one of the methods discussed below. The control unit 26 comprises an operating unit 28 having operator elements (not shown in further detail here). Furthermore, the electric bicycle 10 comprises a first sensor device 30, which serves the measurement of a speed here by way of example as a variable characterizing a state of motion of the electric bicycle 10. Furthermore, the electric bicycle 10 comprises sensor devices 30 (not shown in detail) for the purpose of detecting measurement signals regarding a position of the electric bicycle 10, a driver torque applied to the crank drive 12 of the electric bicycle 10, a user cadence, and a duration of the provision of the trigger signal.

Figure 2:
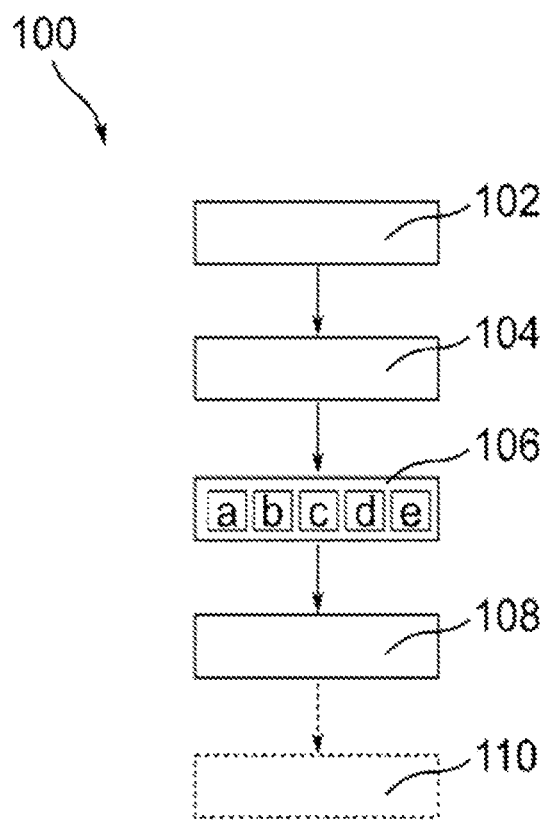
FIG. 2 a method diagram of one embodiment of the method according to the disclosure.

FIG. 2 shows an embodiment example of method 100 for controlling the electric bicycle 10 that can be operated with motor force and/or pedal force in a method diagram. In a first method step 102, a trigger signal for enabling an activation of the walk mode of the electric bicycle 10 is provided to the control unit 26 of the electric bicycle 10, i.e. routed by signal technology. The trigger signal is thereby triggered by a user by means of the operating unit 28 and thus provided to the control unit 26. In method step 104, a measurement signal is provided to at least one of the sensor devices 30 of the control unit 26. The method 100 considers the following measurement signals, which are provided to the control unit 26 in method step 104, regularly or as needed:

a measurement signal regarding a position of the electric bicycle 10;

a measurement signal regarding a speed of the electric bicycle 10;

a measurement signal regarding a driver torque applied to the crank drive 12 of the electric bicycle 10;

a measurement signal regarding a user cadence;

a measurement signal regarding a duration of the provision of the trigger signal.

In method step 106, a plausibility of the trigger signal is then analyzed on the basis of the measurement signal provided in method step 104. In accordance with the measurement signal, a plausibility of the trigger signal is detected on the basis of the provided measurement signal, when a. on the basis of a measurement signal regarding a position of the electric bicycle 10, it is detected that the electric bicycle 10 is in an upright position;

b. on the basis of a measurement signal regarding a speed of the electric bicycle 10, it is detected that the speed of the electric bicycle satisfies a predetermined condition;

c. on the basis of a measurement signal regarding a driver torque applied to the crank drive 12 of the electric bicycle 10, it is detected that the driver torque equals zero;

d. on the basis of a measurement signal regarding a user cadence, it is detected that the cadence equals zero; or e. on the basis of a measurement signal regarding a duration of the provision of the trigger signal, it is detected that the duration falls below a predetermined threshold value.

If one of these conditions a-e is present, the trigger signal is classified as plausible, and then, in method step 108, the electric bicycle 10 is controlled such that the walk mode can be activated, and consequently the activation of the walk mode is enabled. In a subsequent, optional method step 110, it is conceivable to switch on the walk mode, which is now enabled for activation, using a further measurement signal, for example on the basis of a further input by means of the operating unit or by pushing the electric bicycle 10 forward.

Figure 3:
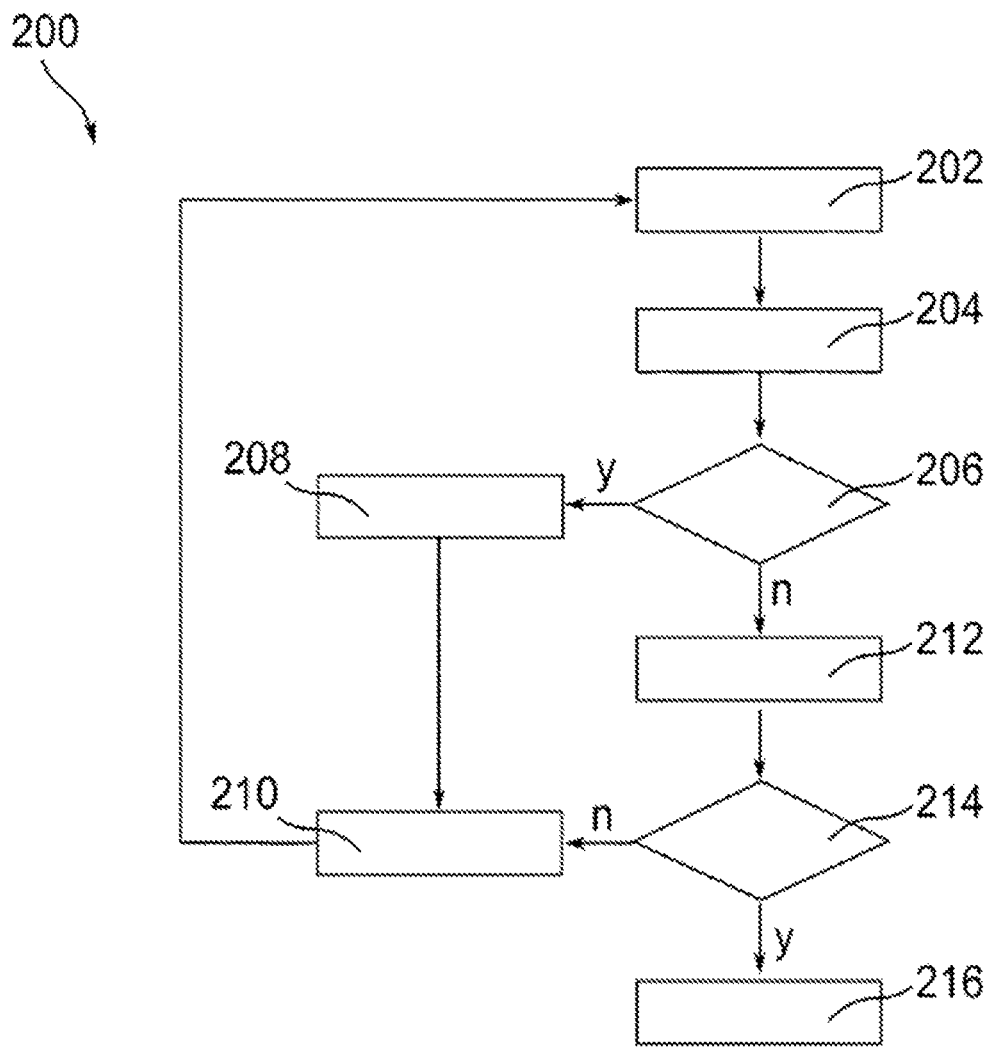
FIG. 3 an extended method diagram of one embodiment of the method according to the disclosure.

In FIG. 3, an extended method 200 is shown as a flowchart. In method step 202, method 200 proceeds in principle from an operating state of any kind (state while driving, standing, after an accident, or the like). In this method step 202, the activation request of the walk mode is awaited, i.e. the triggering of a trigger signal to enable the activation. In method step 204, a trigger signal for activating the walk mode is detected by the control unit 26. The subsequent method step 206 comprises the method steps 104 and 106 of the method 100 explained above, i.e. the analysis of a provided measurement signal as well as a plausibility check of the trigger signal based thereon. Thus, upon completion of the method step 206, it is analyzed whether the trigger signal can be classified as plausible (path "y") or not (path "n"). In the event that the trigger signal is detected as plausible, in method step 208 the electric bicycle 10 is controlled such that the activation of the walk mode is enabled (and can consequently be activated, i.e. switched on, by satisfying a further condition). The activation of the walk mode is enabled until a deactivation signal in the form of a further trigger signal is triggered in method step 210 or the trigger signal for the actual activation is missing. In this case, the method step 202 is reentered, in which a (re) activation request of the walk mode is awaited. In the event that the trigger signal is not detected as plausible in method step 206 (path "n"), the activation of the walk mode is not enabled in method step 212. Instead, in the control unit 26 carrying out the method 200, a counter is incrementally increased (alternatively decreased). In the subsequent method step 214, it is then queried whether this counter has already exceeded a specified number of allowable activation requests with undetected plausibility. For example, this number can be three. If this is the case (path "y"), the possibility of enabling the activation of the walk mode is completely deactivated in method step 216, at least until a restart of the control unit 26 of the electric bicycle 10. Consequently, this function is no longer available until the control unit 26 is restarted. Furthermore, information (for example, a warning) is output to the user (in case of a restart, the counter is again reset, for example to zero or to a last saved value minus a constant). If the counter has not yet reached (or exceeded) the specified number of allowable activation requests with undetected plausibility (path "n"), the method step 202 is reentered, in which the activation request of the walk mode is awaited, by way of the method step 210, in which the trigger signal for the actual activation is missing.

The invention claimed is:

1. A method for controlling an electric bicycle that can be operated with motor force and/or with pedal force, comprising:
providing at least one trigger signal for enabling the activation of a walk mode and/or for activating the walk mode to a control unit of the electric bicycle,
providing a measurement signal of a sensor device regarding a property of the electric bicycle and/or regarding a component comprised by the electric bicycle to the control unit,
detecting plausibility of the trigger signal on the basis of the provided measurement signal, and
controlling the electric bicycle by enabling the activation of the walk mode in accordance with the detection of the plausibility of the trigger signal.

2. The method according to claim 1, wherein the measurement signal relates to a position of the electric bicycle, and the plausibility of the trigger signal is detected when the electric bicycle is in an upright position.

3. The method according to claim 1, wherein the measurement signal relates to a state of motion of the electric bicycle, and the plausibility of the trigger signal is detected when the state of motion satisfies a predetermined condition.

4. The method according to claim 1, wherein the measurement signal relates to a driver torque applied to a crank drive of the electric bicycle, and the plausibility of the trigger signal is detected when the driver torque equals zero.

5. The method according to claim 1, wherein the measurement signal relates to a user cadence, and the plausibility of the trigger signal is detected when the cadence equals zero.

6. The method according to claim 1, wherein the measurement signal relates to a duration of the provision of the trigger signal, and the plausibility of the trigger signal is detected when the duration falls below a predetermined threshold value.

7. The method according to claim 1, wherein the trigger signal is provided by way of an operating unit of the electric bicycle by a user.

8. The method according to claim 1, wherein the enabling of the activation of the walk mode and/or the activation of the walk mode is suspended when the plausibility of the trigger signal is not detected until the plausibility of the trigger signal is detected.

9. The method according to claim 1, wherein:
in accordance with a number of provided trigger signals with undetected plausibility and/or in accordance with a duration of a provided trigger signal, a function of the electric bicycle is carried out or terminated or modified.

10. The method according to claim 1, wherein:
in addition to enable an activation of the walk mode, the trigger signal is additionally used for activating of the walk mode.

11. An electric bicycle that can be operated with motor force and/or with pedal force, comprising:
an electric drive,
a crank drive,
at least one torque sensor configured so as to detect a torque applied by a driver to the crank drive, and
a control unit,
wherein the control unit is configured so as to actuate the electric drive in accordance with the detected torque, and
wherein the control unit is further configured so as to carry out a method according to claim 1.

12. The method according to claim 1, wherein the measurement signal relates to a speed and/or an acceleration of the electric bicycle, and the plausibility of the trigger signal is detected when the state of motion satisfies a predetermined condition.

13. The method according to claim 1, wherein:
in accordance with a number of provided trigger signals with undetected plausibility and/or in accordance with a duration of a provided trigger signal independent of a detection of its plausibility, a function of the electric bicycle is carried out or terminated or modified.

* * * * *